United States Patent
Tsotsis

(10) Patent No.: US 10,060,042 B2
(45) Date of Patent: Aug. 28, 2018

(54) TOOLING HAVING A DURABLE METALLIC SURFACE OVER AN ADDITIVELY FORMED POLYMER BASE AND METHOD OF FORMING SUCH TOOLING

(71) Applicant: The Boeing Company, Chicago, IL (US)

(72) Inventor: Thomas K. Tsotsis, Santa Ana, CA (US)

(73) Assignee: The Boeing Company, Chicago, IL (US)

( * ) Notice: Subject to any disclaimer, the term of this patent is extended or adjusted under 35 U.S.C. 154(b) by 246 days.

(21) Appl. No.: 15/089,739

(22) Filed: Apr. 4, 2016

(65) Prior Publication Data
US 2017/0283972 A1     Oct. 5, 2017

(51) Int. Cl.
| | | |
|---|---|---|
| *C25D 7/00* | (2006.01) | |
| *C25D 5/34* | (2006.01) | |
| *B64F 5/00* | (2017.01) | |
| *B33Y 10/00* | (2015.01) | |
| *C25D 5/10* | (2006.01) | |
| *C25D 5/56* | (2006.01) | |
| *C23C 18/16* | (2006.01) | |
| *B33Y 80/00* | (2015.01) | |

(52) U.S. Cl.
CPC ............ *C25D 7/00* (2013.01); *B33Y 10/00* (2014.12); *B64F 5/0009* (2013.01); *B64F 5/0081* (2013.01); *C23C 18/1653* (2013.01); *C25D 5/10* (2013.01); *C25D 5/34* (2013.01); *C25D 5/56* (2013.01); *B33Y 80/00* (2014.12)

(58) Field of Classification Search
CPC ..................................................... C25D 5/54
See application file for complete search history.

(56) References Cited

U.S. PATENT DOCUMENTS

| 8,778,498 B1 | 7/2014 | Tsotsis |
| 8,916,248 B2 | 12/2014 | McCrea et al. |
| 2011/0020631 A1 | 1/2011 | Miller et al. |
| 2012/0234681 A1 | 9/2012 | Lomansney et al. |
| 2014/0004352 A1 | 1/2014 | McCrea et al. |
| 2014/0030592 A1 | 1/2014 | Maegawa et al. |
| 2016/0002790 A1 | 1/2016 | Whitaker et al. |
| 2016/0002813 A1 | 1/2016 | Lomasney |
| 2016/0009051 A1 | 1/2016 | Tsotsis |
| 2016/0288372 A1* | 10/2016 | Tsotsis ............. C25D 7/00 |

FOREIGN PATENT DOCUMENTS

GB     2254820 A     10/1992

OTHER PUBLICATIONS

European Patent Office Extended Search Report dated Aug. 11, 2017 for Application No. 17151815.2.

* cited by examiner

*Primary Examiner* — Kuo Liang Peng
(74) *Attorney, Agent, or Firm* — Economou Silfin, LLP; John S. Economou

(57) ABSTRACT

A tool and a method for forming a tool are disclosed. The tool has a base layer additively formed from a polymer material in a desired tool shape. In addition, a sealant layer is formed over an outer surface the base layer. The sealant is a low-modulus material such as a silicone rubber or an elastomer. In one embodiment, the sealant is made electrically conductive by the addition of a filler to the low-modulus material. The filler material may be one of carbon black, carbon fibers, graphene, carbon nanotubes, and metallic whiskers, for example. In another embodiment, the sealant is not electrically conductive and an electrically conductive layer is formed over the sealant layer. Finally, a metallic coating, preferably multilayer, is formed over the sealant layer by electroplating or electrodeposition.

3 Claims, 5 Drawing Sheets

TOOLING HAVING A DURABLE METALLIC SURFACE OVER AN ADDITIVELY FORMED POLYMER BASE AND METHOD OF FORMING SUCH TOOLING

FIELD

This disclosure relates generally to tooling having a durable metallic surface over an additively formed polymer base layer and a method of forming such tooling.

BACKGROUND

The manufacture, assembly, maintenance, modification and/or upgrade to an aircraft always requires the creation of tools used to make parts for the aircraft. This tooling is often machined from solid metal in order to ensure the surface quality, surface robustness and durability thereof. However, the preparation and construction of such metallic tooling can be costly and time-intensive. Additively manufactured polymer tooling can be manufactured much more quickly and inexpensively than tooling formed from metals, but the durability, surface quality and surface robustness of polymer-based tooling is a concern.

Accordingly, there is a need for an improved method of forming tooling which can be formed more quickly like additively formed polymer tooling and which also provides the surface quality, surface robustness and durability provided by metallic tooling.

SUMMARY

In one aspect, a tool has a base layer additively formed from a polymer material in a desired tool shape. A sealant layer is formed over an outer surface the base layer, the sealant being electrically conductive. Finally, a metallic coating is formed over the sealant layer.

The sealant may be a low-modulus material, such as a silicone rubber or an elastomer. Preferably, the sealant is made electrically conductive by the addition of a filler material added to the sealant. The filler material may be one of carbon black, carbon fibers, graphene, carbon nanotubes, metal whiskers, or other conductive materials and combinations therefrom. The metallic coating may be a multilayer metallic coating. The metallic coating may be formed by electroplating or by electrodeposition.

In another aspect, a tool has a base layer additively formed from a polymer material in a desired tool shape. A sealant layer is formed over an outer surface the base layer, the sealant being not electrically conductive. An electrically conductive layer is formed over the sealant layer. Finally, a metallic coating is formed over the electrically conductive layer.

In a third aspect, a method of forming a tool. A base layer is formed in a desired tool shape additively from a polymer material. A sealant layer is formed over an outer surface the base layer, the sealant being electrically conductive. Finally, a metallic coating is formed over the electrically conductive layer.

In a fourth aspect, a method of forming a tool. A base layer is formed in a desired tool shape additively from a polymer material. A sealant layer is formed over an outer surface the base layer, the sealant being a low-modulus material comprising a silicone rubber or an elastomer. An electrically conductive layer is formed over the sealant layer. Finally a metallic coating is formed over the electrically conductive layer.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

Figure 1:
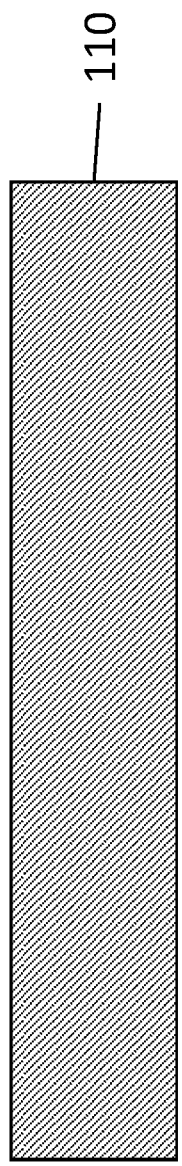
FIG. 1 is a cross-sectional view of an additively manufactured polymer base layer for a tool according to an aspect of the present disclosure.

Referring now to the drawings, and in particular to FIG. 1, a tool according to the present disclosure includes a base layer 110 which is formed in a desired tool shape from a polymer by an additive process (e.g., by 3D printing) to tight dimensional tolerances (as required by the desired tool). Base layer 110 acts as a base for further processing according to the present disclosure. As one of ordinary skill in the art will readily recognize, in 3D printing, successive layers of a material are formed under computer control to create an object produced from a three-dimensional model or other electronic data source. The generation of the base layer 110 for the tooling of the present disclosure by this type of additive process is much quicker and much less expensive than generating the tooling by metal machining, even if some interim machining of the polymer-formed base layer 110 is required after formation thereof. However, because the polymers used in this additive process may be less robust and durable than tooling which is formed completely from metal, the tooling of the present disclosure includes a metallic coating to improve the robustness and durability of the final tool which is formed as discussed below with respect to FIGS. 2 to 4. Additionally, the metallic coating can also improve the surface finish and quality of the final tool.

Figure 2:
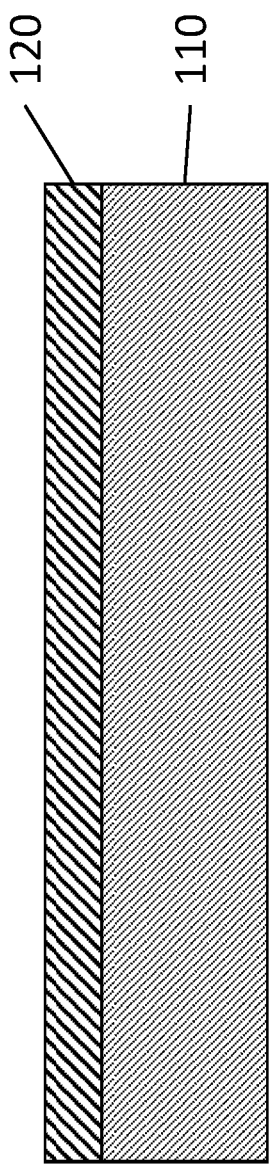
FIG. 2 is a cross-sectional view of a tool with an additively manufactured polymer base layer after being sealed/treated according to an aspect of the present disclosure.

In FIG. 2, a sealant layer 120 is applied to the outer (tool-side) surface of base layer 110 to impart sufficient conductivity to the polymer base layer 110 to allow for subsequent processing. The application of sealant 120 may involve the application of a low-modulus material such as a silicone rubber or an elastomer to alleviate the build-up of thermal stresses between adjacent materials during use of the finished tool. In one embodiment, sealant 120 is made conductive by use of fillers such as carbon black, carbon fibers, graphene, carbon nanotubes, metal whiskers, or the like or by electroless plating, for example.

Figure 3:
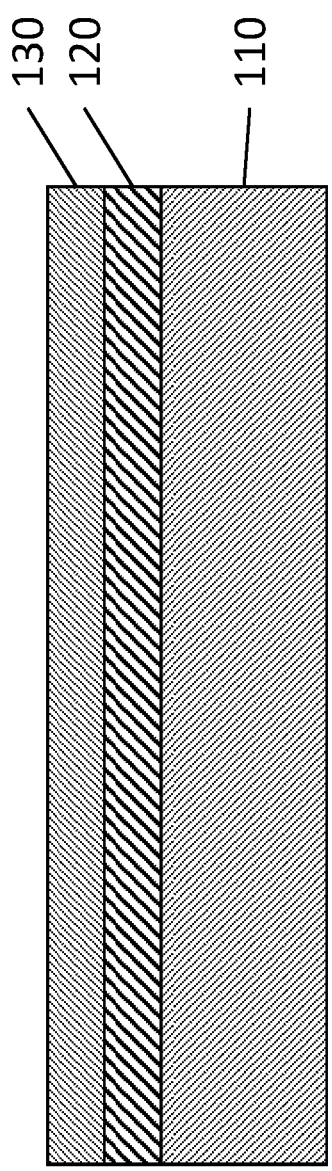
FIG. 3 is a cross-sectional view of a tool with an additively manufactured polymer base layer after application of an electrically conductive layer according to an aspect of the present disclosure.

In FIG. 3, an electrically conductive layer 130 is optionally applied to the outer tool-side surface of base layer 110 over sealant layer 120 to provide sufficient electrical conductivity to heat the resultant subsequent metallic tool surface to requisite temperature (e.g., between 100-250 deg. C.). This conductive layer 130 is only necessary when the sealant layer 120 is not conductive, as discussed above. If the elastomer is not sufficiently electrically conductive to allow for subsequent electrodeposition, functional groups, such as through oxidative polymerization of dopamine to a rubber substrate or other chemical techniques, may be added to the elastomer surface to provide sites where metals may be molecularly attached. Dopants may also be added to the elastomer during synthesis to help increase polymer electrical conductivity. Alternately, polymers such as polyacetylene, polypyrrole, polyphenylene vinylene, polypyrrole, polythiophene, polyanilines, polyphenylene sulfide, and others along with their copolymers may be attached to the surface of the elastomer through surface modification such as phosphonylation and graft polymerization or other suitable methods.

Figure 4:
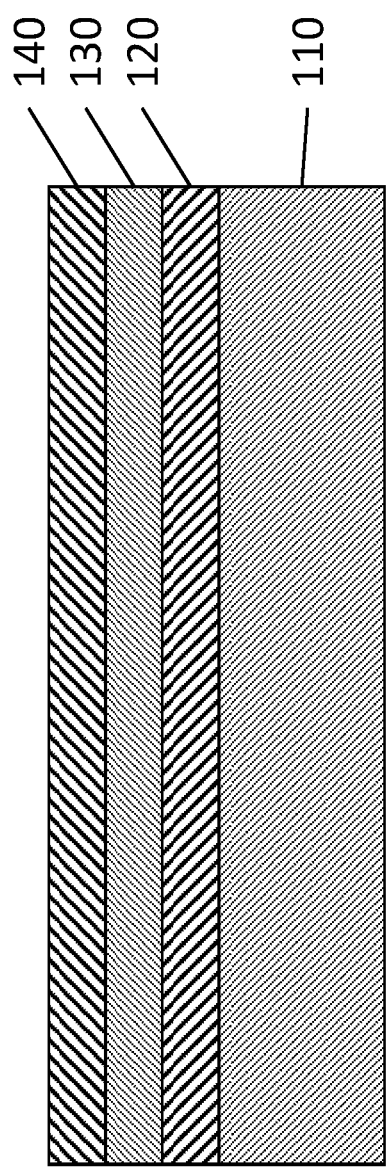
FIG. 4 is a cross-sectional view of a tool with an additively manufactured polymer base layer after application of a metallic coating according to an aspect of the present disclosure.

In FIG. 4, a metallic coating 140, preferably a multilayer metallic coating, is applied to the outer tool-side surface of base layer 110 over the electrically conductive layer 130 (or over sealant layer 120 when sealant layer 120 is conductive) using, for example, electroplating or electrodeposition to form a tool surface of the requisite dimensions for the end tool. Metal coatings can include different grades of steel or aluminum or combinations of metals with harder outer layers and lower-modulus inner layers. Layered structured could, for example, have steel-based outer layers and copper or brass inner layers. Many other combinations are possible. Since an additive process is used to form the base layer 110 of the desired end tool, the level of complexity of end tool shape is only limited by ability of polymer base layer to be formed in the desired shape, to be optionally machined (if necessary) and to hold the final shape of the desired end tool. The inclusion of metallic coating 140 is not limited at all by the shape or complexity of the desired end tool.

Figure 5:
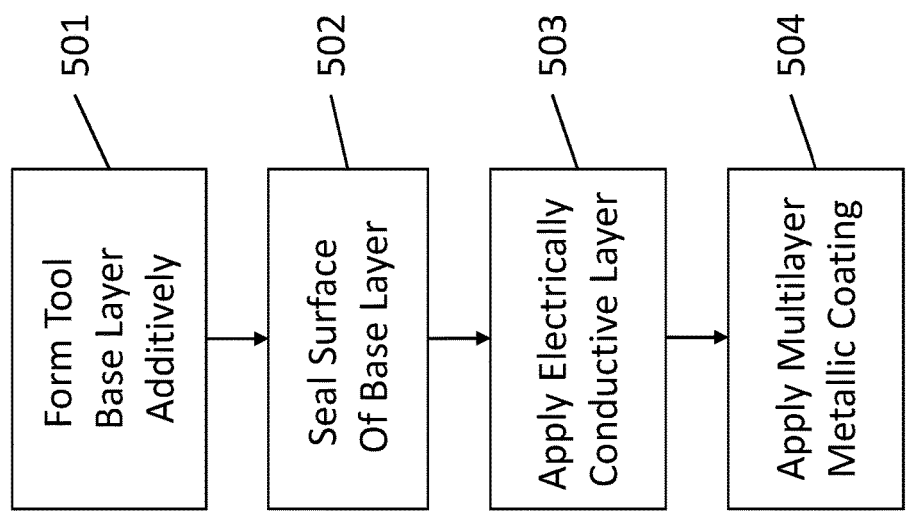
FIG. 5 is a flowchart illustrating a method of forming a tool according to an aspect of the present disclosure.

Referring now to FIG. 5, a flowchart is shown of the steps involved in generating a tool according to the present disclosure. First, as discussed above, a tool base layer 110 is additively formed to the shape of the desired end tool (step 501). Next, a sealant layer 120 is applied to the outer tool-side surface of base layer 110 (step 502). In one embodiment, the sealant applied in step 502 is not electrically conductive, and a separate electrically conductive layer is necessary (step 503). In another embodiment, the sealant applied in step 502 is electrically conductive, and a separate electrically conductive layer is not necessary. Further, an electrically conductive layer 130 is optionally applied to the outer tool-side surface of base layer 110 over sealant layer 120 (step 503) when the sealant applied to form sealant layer 120 is not electrically conductive. Finally, a metallic coating 140 is applied to the outer tool-side surface of base layer 110 over the electrically conductive layer 130 (step 504) (or over the sealant layer 120 in the embodiment where the separate electrically conductive layer 130 is omitted).

The tooling of the present disclosure includes a metallic outer coating which is robustly attached to the underlying substrate (as described above) in a manner that prevents debonding, spalling, or cracking of such outer coating during use of the tooling. In particular, the tooling formation described herein allows for very strong bonds to be created between the metallic outer coatings and the underlying substrate. Additionally, the addition of the low-modulus material between the underlying substrate and the metallic outer coating accounts for mismatches in the coefficient of thermal expansion (CTE) of these dissimilar materials, which often occur when the tooling is used at high temperatures, such as during the cure of a thermoset composite. As such, the addition of the low-modulus material between the underlying substrate and the metallic outer coating also serves to prevent debonding, spalling, or cracking of the metallic outer coating during use of the tooling at high temperature (e.g., a high-temperature cure).

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A method of forming a tool, comprising the steps of:
   forming a base layer in a desired tool shape additively from a polymer material;
   forming a sealant layer over an outer surface of the base layer, the sealant being electrically conductive; and
   forming a metallic coating over the electrically conductive layer.

2. The method of claim 1, wherein the sealant is a low-modulus material comprising a silicone rubber or an elastomer.

3. The method of claim 2, wherein the sealant is made electrically conductive by the addition of a filler material added to the sealant, the filler material being one of carbon black, carbon fibers, graphene, carbon nanotubes, and metallic whiskers.

* * * * *